Aug. 7, 1928.

W. J. NEWTON 1,680,062

COMBINATION MIRROR AND ILLUMINATING DEVICE

Filed Feb. 24, 1925

INVENTOR.
William J. Newton
BY
G. H. Braddock
ATTORNEY.

Patented Aug. 7, 1928.

1,680,062

UNITED STATES PATENT OFFICE.

WILLIAM J. NEWTON, OF BRIDGEPORT, CONNECTICUT, ASSIGNOR TO METROPOLITAN ELECTRIC MANUFACTURING COMPANY, OF LONG ISLAND CITY, NEW YORK.

COMBINATION MIRROR AND ILLUMINATING DEVICE.

Application filed February 24, 1925. Serial No. 11,299.

This invention relates to a mirror with illuminating device, adapted to be employed for a variety of purposes, but more especially adapted for use as a "shaving" or "make-up" mirror.

An object of the invention is to provide a mirror, a lamp, and a reflector combined with each other in such manner that only reflected rays of light from the lamp can strike an article or body directly in front of the mirror.

A further object is to provide a mirror having an illuminating device so arranged that only reflected rays of light can emanate from the illuminating device to strike an article or body in front of and at about the elevation of the mirror.

A further object is to provide a mirror having an illuminating device as just stated so located with respect to the mirror that an eye of a user of the mirror can be located at the front of said mirror in position to be clear of all rays of light from said illuminating device while an object to be viewed is in front of said mirror, and close to or far from said eye, in the path of rays of light emanating from said illuminating device.

A further object is to provide a "shaving" or "make-up" mirror including a lamp with reflector adapted to throw approximately all rays of light from said lamp upon a part of the body of a user of the mirror and clear of said user's eyes.

A further object is to provide in combination, an ordinary mirror and an illuminating device consisting of a lamp and a reflector, and to locate the mirror, lamp and reflector with respect to each other (1) so that direct rays of light from the lamp can not strike an article or body directly in front of the mirror, and (2) so that all rays of light from said lamp can be projected by said reflector upon said article or body.

A further object is to provide a mirror having a lamp at the rear of its lower portion, and having a reflector, within the confines of which the lamp is situated, extending from the location of said lamp, downwardly and forwardly, and terminating at a location beneath and spaced from the lower edge of said mirror, whereby when the lamp is lighted rays of light will strike said reflector and be projected from a location at the rear of said mirror to the general location of space at the front thereof and at about the elevation of the mirror.

And a still further object is to provide a simple, novel, and inexpensive article of manufacture in which all of the features and characteristics of the invention as above outlined are incorporated.

With these objects in view, as well as others which will appear as the specification proceeds, the invention comprises the construction, arrangement and combination of parts as now to be fully described and as hereinafter to be specifically claimed, it being understood that the disclosure herein is merely illustrative of principle and meant in no way in a limiting sense, changes in details of construction and arrangement of parts being permissible so long as within the spirit of the invention and the scope of the appended claims.

In the accompanying drawing forming a part of this specification,

Figure 1:
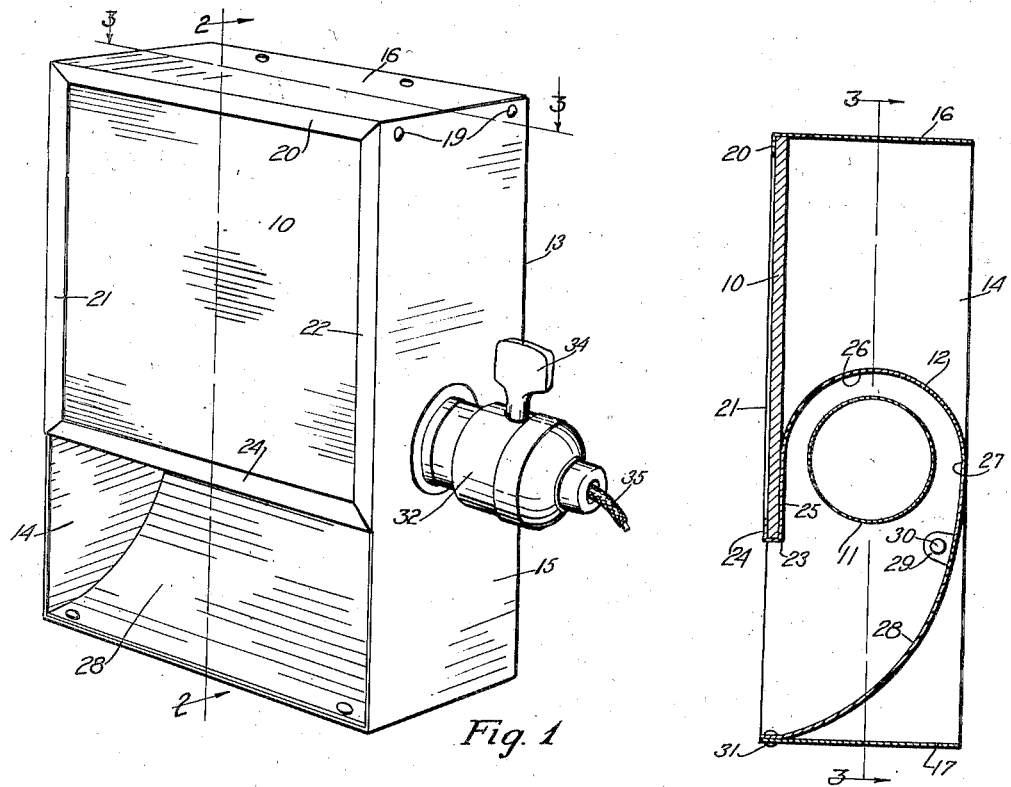
Fig. 1 is a perspective view of an article of manufacture which includes in its structure the mirror and illuminating device.
Figure 2:
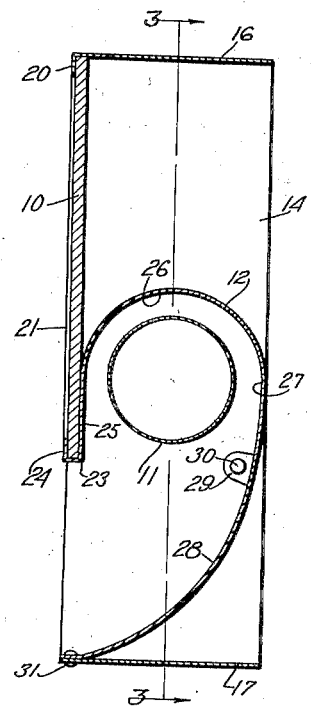
Fig. 2 is a sectional view on line 2—2 in Figs. 1 and 3.

With respect to the drawing, 10 is a mirror, 11 a lamp, 12 a reflector, and 13 is a frame by which the mirror, lamp and reflector are carried.

As disclosed, the frame is rectangular, consisting of parallel spaced apart side walls, denoted 14 and 15, and parallel spaced apart top and bottom walls, denoted 16 and 17. The front and rear spaces between the walls are open. Preferably, the frame 13 is composed of a single strip of sheet metal, bent at the three locations 18 to provide the meeting edges between the walls 16—14, 14—17, and 17—15 thereof, and having its ends secured together as by the rivets 19 to provide the meeting edge between the walls 15—16, although the arrangement could be otherwise.

The mirror 10 is situated in the upper portion of the frame 13 at its front, and the lamp 11 is at the rear of the lower portion of the mirror and within the confines of the reflector 12 which extends downwardly and forwardly from the location of the lamp and the rear of the frame and terminates at the front of the bottom wall of the frame at a distance from the lower edge of the mirror.

More specifically, the walls 16, 14 and 15 of the frame 13 have upon their front edges inwardly extending flanges, denoted 20, 21 and 22, respectively, which fit over the marginal portions of the mirror at its top and sides.

The reflector is at its upper portion of general cylindrical shape, including an upper straight front terminal or edge 23 with forwardly and upwardly disposed way or pocket 24 integral with the reflector and receiving the lower marginal portion of the mirror to hold the upper edge of said mirror against the inner face of the top wall 16 of the frame.

A portion of the reflector above its upper front terminal or edge 23 is flat and vertical, as denoted at 25, to engage a substantial part of the lower portion of the rear face of the mirror and thus fix, with the aid of the flanges 20, 21 and 22 and the way or pocket 24, the position of the mirror in the frame.

The upper end of the flat, vertical part 25 of the reflector merges in a part-cylinder 26 extending to the rear of the walls 14 and 15 of the frame, as denoted at 27, and at this location 27 the part-cylinder 26 merges in a flat, parabolic surface 28 curving gently, downwardly and forwardly, to the front of the frame and terminating directly below the mirror at the front edge of the bottom wall 17 of the frame.

The reflector is desirably of length equalling the distance between the side walls 14 and 15 of the frame, and its position in the frame as described is partially insured by its engagement with the mirror. As illustrated, the portions of the opposite ends of the reflector adjacent the location 27 have integral right-angle ears 29 secured by rivets 30 to the walls 14 and 15, respectively, and the lower, front terminal or edge portion of said reflector is riveted at 31 to the front edge portion of the bottom wall 17 of the frame.

Figure 3:
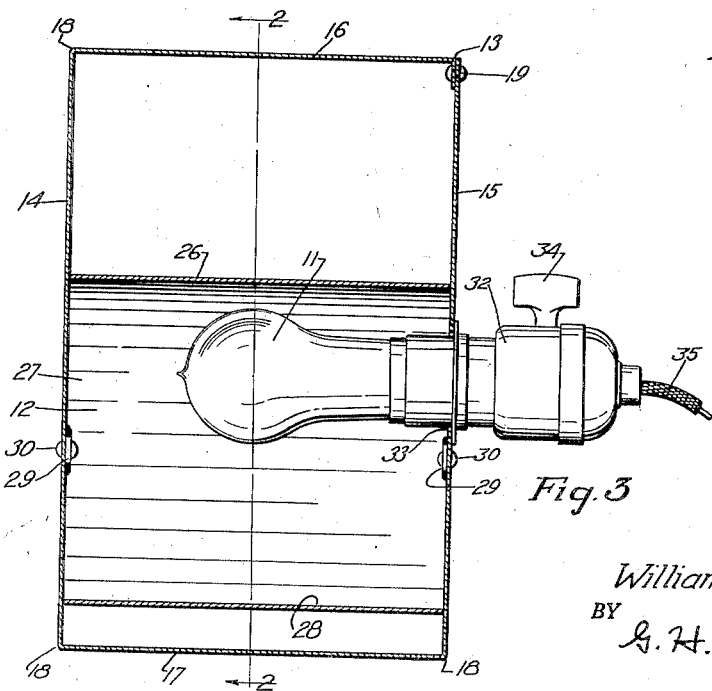
Fig. 3 is a sectional view on line 3—3 in Figs. 1 and 2.

The lamp 11, which can be an ordinary electric lamp, is situated within the part-cylinder 26 of the reflector and at the rear of the lower portion of the mirror, said lamp desirably being at the center of said part-cylinder and adjacent the flat, vertical portion 25 of the reflector. As shown more clearly in Figs. 1 and 3, the lamp socket 32 is fixed in any suitable manner in an opening 33 in the wall 15 of the frame. 34 is a key beyond the frame, and 35 is a lead wire to a source of electric current (not disclosed).

Clearly, the relative arrangement of the mirror, lamp and reflector could be different from the arrangement shown, and the reflector could be of some different configuration, perhaps more suitable for some particular purpose. I have found, however, that an arrangement of the elements about as illustrated is very satisfactory when the purpose for which the mirror is employed is that of "shaving" or "making-up."

The mirror, lamp, and reflector herein are constructed and situated with respect to each other so that direct rays of light from the lamp when lighted cannot strike an article or body in front of and at about the elevation of the mirror, but so that approximately all rays of light from said lamp will be projected by said reflector upon said article or body; that is to say, so that approximately all reflected rays of light from said lamp will be projected from a location at the rear of said mirror to the general location of space at the front thereof and at about the elevation of the mirror. Evidently, when the mirror is used for "shaving" or "making-up" purposes, the eye of a user of the mirror, when this is considered convenient or desirable, can be positioned to be clear of all reflected rays while a part of the body of said user other than said eye, to be viewed through the mirror, is in the path of said rays. Or, any article at the front of the mirror might be viewed therein by an eye without the border line of the reflected rays of light from the illuminating device.

In the practice of the present invention, the reflected rays of light from the illuminating device are projected or concentrated upon an article or body in front of the mirror to very sharply and clearly define the image in the mirror. In fact, the light imparted to an article or body, when using a lamp of medium strength, is quite acute, bringing out in the image small lines or defects of the article or body not ordinarily discernible by a better than average naked eye at close range and in the clearest of day light.

Having thus fully described the invention, what I claim as new and desire to secure by Letters Patent is:

1. An article of manufacture, comprising a mirror, a lamp, and a reflector, and a frame carrying said mirror, lamp and reflector, said frame including flanges at its front engaging the marginal portions of the front face of the mirror at the top and sides of the mirror, said reflector being at the rear of the lower portion of said mirror and including a pocket in which the lower edge of the mirror rests, and said reflector also including a flat, vertical portion engaging a substantial part of the lower portion of the rear face of the mirror to fix, with the aid of the flanges of the frame and the pocket of the reflector, the position of the mirror in the frame, the flat, vertical portion of the reflector merging in a part-cylinder thereof which extends about a part of said lamp, and said part-cylinder of said reflector merging in a flat, parabolic surface extending downwardly and forwardly in the frame and terminating at a location below and spaced from the lower edge of said mirror.

2. The combination as specified in claim 1, wherein the frame is rectangular, and means for securing the parabolic surface of the reflector in said frame.

Signed at Bridgeport, in the county of Fairfield, and State of Connecticut, this 20th day of February, A. D. 1925.

WILLIAM J. NEWTON.